US009526206B2

(12) United States Patent
Schulze Rückamp et al.

(10) Patent No.: US 9,526,206 B2
(45) Date of Patent: Dec. 27, 2016

(54) HEADER WITH CENTER PART AND SIDE PARTS ADJUSTABLE RELATIVE TO THE CENTER PART

(71) Applicant: Carl Geringhoff GmbH & Co. KG, Ahlen (DE)

(72) Inventors: Jan Bernd Schulze Rückamp, Ennigerloh-Enniger (DE); Steffen Sudhues, Ahlen (DE); Reimer Tiessen, Oldenburg (DE); Michael Pokriefke, Hude (DE); Robert Sonnen, Beckum (DE); Klemens Surmann, Ahlen (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 0 days.

(21) Appl. No.: 14/552,659

(22) Filed: Nov. 25, 2014

(65) Prior Publication Data

US 2015/0373907 A1 Dec. 31, 2015

(30) Foreign Application Priority Data

Jun. 25, 2014 (DE) ........................ 10 2014 009 161

(51) Int. Cl.
*A01D 41/16* (2006.01)
*A01D 41/06* (2006.01)

(52) U.S. Cl.
CPC ............... *A01D 41/16* (2013.01); *A01D 41/06* (2013.01)

(58) Field of Classification Search
CPC ...... A01D 34/04; A01D 34/286; A01D 41/06; A01D 41/144; A01D 41/145; A01D 41/148; A01D 34/246; A01D 34/283; A01D 34/662; A01D 41/16

USPC ................ 56/210, 209, 159, 187, 15.2, 15.3
See application file for complete search history.

(56) References Cited

U.S. PATENT DOCUMENTS

| 4,070,123 | A | * | 1/1978 | Willingshofer | B60G 7/005 280/124.155 |
|---|---|---|---|---|---|
| 4,409,780 | A | * | 10/1983 | Beougher | A01B 73/02 172/456 |
| 4,956,966 | A | | 9/1990 | Patterson | |
| 6,675,568 | B2 | * | 1/2004 | Patterson | A01D 41/14 56/208 |
| 7,614,206 | B2 | * | 11/2009 | Tippery | A01D 41/144 56/15.8 |
| 8,528,308 | B2 | * | 9/2013 | Priepke | A01D 34/661 172/311 |

(Continued)

FOREIGN PATENT DOCUMENTS

EP    1 401 256 B1    3/2004

*Primary Examiner* — John G Weiss
(74) *Attorney, Agent, or Firm* — Gudrun E. Huckett (57) ABSTRACT

A header of a combine harvester has a center part connected by an attachment frame to the combine feed channel. A first side part with first lateral frame and a second side part with second lateral frame are adjustable for changing their position relative to the center part. The first and second lateral frames are connected by a first ball joint and a second ball joint to the attachment frame, respectively so that the weight of the first and second lateral frames is supported by the first and second ball joints on the attachment frame. The first and second ball joints form first and second pivot axes. An end of the first lateral frame facing away from the center part is pivotable about the first pivot axis. An end of the second lateral frame facing away from the center part is pivotable about the second pivot axis.

8 Claims, 4 Drawing Sheets

(56) References Cited

U.S. PATENT DOCUMENTS 8,635,842 B2 * 1/2014 Markt .................... A01D 41/14
　　　　　　　　　　　　　　　　　　　　　　　56/14.7
9,072,222 B2 * 7/2015 Bomleny ............. A01D 41/144

* cited by examiner

Fig. 4

HEADER WITH CENTER PART AND SIDE PARTS ADJUSTABLE RELATIVE TO THE CENTER PART

BACKGROUND OF THE INVENTION

The present invention concerns a multi-part header for attachment to a combine harvester, comprising a center part that is connectable by means of an attachment frame to the feed channel of a combine harvester and at least two side parts each to a corresponding lateral frame whose relative position to the center part is adjustable.

U.S. Pat. No. 4,956,966 discloses a header of the aforementioned kind that is connectable by means of an attachment frame to the feed channel of a combine harvester. The attachment frame is height-adjustably connected to the feed channel in order to be able to guide the header upon forward travel into a grain field at an appropriate spacing to the ground. The attachment frame is additionally pivotable about an axis that extends parallel to the forward travel direction of the combine harvester in order to be able to adjust, in transverse direction, the position of the header relative to the ground contour that is changing during forward travel of the combine harvester. The header comprises a central and two lateral belt conveyors which together are secured in a common frame. For greater working widths, such a header comprising only a single common frame is not adjustable precisely enough to a changing ground contour.

From EP 1 401 265 it is known to divide a header of the aforementioned kind across its working width into a central frame section and two wing frame sections laterally arranged thereto so that a header is provided with three frame sections distributed across its working width. The central frame section is connected by a fastening structure to the feed channel of the combine harvester. In this arrangement, the respective frame sections, upon forward travel of the combine harvester across a field to be harvested, can adjust with their respective partial working width to the respective changes in the ground contour of the field corresponding to the partial working width. This provides a better work result because the frame sections with their partial working width can react more precisely to differences in the ground contour across the working width of the header. The wing frame sections are connectable by means of the central frame section to the feed channel of a combine harvester. The wing frame sections are supported by the central frame section.

Due to the combine harvesters becoming more and more powerful and the working widths of the headers therefore increasing more and more, the weight of the headers has increased more and more. The fastening structure with which the header is to be connected to the feed channel of the combine harvester must transmit increasingly greater forces and therefore must be designed in turn to be increasingly heavier. Also, the main frame that extends across the working width of the header becomes increasingly heavier. Due to the increasing weights, it is becoming more and more difficult to adjust a multi-part header with a sufficiently fast response time to changing ground contours upon forward travel of the combine harvester.

It is the object of the present invention to improve the connection of the header to the feed channel of a combine harvester in order to still enable, even for great working widths of a header, a ground adaptation with a fast response time.

SUMMARY OF THE INVENTION

The object is solved for a header of the aforementioned kind in that each lateral frame is connected by at least one connecting element embodied as a ball joint directly to the attachment frame, in that the lateral frame with its weight is supported at least partially by the ball joint on the attachment frame, and the ball joint forms the pivot axis about which the lateral frame is pivotable with the end that is facing away from the center part.

Due to the direct attachment of the lateral frames on the attachment frame, the center part can be designed to be more lightweight because it must no longer support the bearing loads of the side parts and transmit them onto the attachment frame. The adjustment of the height position of the center part relative to the ground can be realized faster and easier because the center part is relieved significantly due to the construction according to the invention. The ball joints on which the two side parts are supported are unsusceptible to soiling, they are low-maintenance, and can absorb high loads. By means of the ball joints the lateral frames can be pivoted, substantially independent of the spatial position of the center part, into a desired pivot position so that the adjustment of the pivot position to the ground contours that are changing during forward travel of the combine harvester is simplified. The position of the ball joints can be selected independent of the construction of the frame of the center part so that the ball joints can be also positioned behind the rear wall of the center part and thus closer to the front axis of the combine harvester so that the leverage forces that are acting on the feed channel and the frame of the combine harvester are reduced. Finally, due to the freely selectable position of the ball joints more degrees of freedom in regard to the construction and configuration of the machine elements that are required for conveying the cut crop in the header and the feed action into the feed channel of the combine harvester, wherein in particular the interface area between the center part and the side parts is critical because here the crop must be deflected reliably into the feed channel and here also the drives and control and governing devices are positioned closely adjacent to each other and priority conflicts must be solved.

According to one embodiment of the invention, the ball joint is arranged adjacent to the feed channel and in the area of the lower half of the feed channel, the ball joint is connected to the lateral frame and the attachment frame by means of a rigid guide arm, and a pivot movement of the lateral frame supported by the ball joint transverse to the travel direction is adjustable by means of actuation of a motorically adjustable guide arm which, with a first end, engages at a spacing to the ball joint at a point of attack provided on the lateral frame and, with a second end, is connected to the center part or the attachment frame. Due to the arrangement of the ball joint in the area of the lower half of the feed channel, the center of gravity of the total construction remains low and close to the ground, and the belt length of the belt conveyor transporting transversely to the travel direction is not changed upon pivoting about the axis of rotation which extends in the travel direction. By the arrangement adjacent to the feed channel, the latter can remain unchanged. Due to the rigid configuration of the connecting guide arms, defined positions and movement possibilities for the side parts relative to the fixed position of the respective ball joint result. The rigid guide arms can be designed to match exactly the bearing loads that are to be absorbed by them. Based on the spacing between the ball joint and the point of attack, geometries for adjusting strokes result by means of which the side parts can be pivoted from one extreme position into another extreme position and into any position in between. The motorically adjustable guide arm enables by means of an appropriate configuration an automation of the continuous ground adjustment of the pivot position as well as remote operation from the driver's cabin. With the motorically adjustable guide arm, a lateral frame can be lifted or lowered into a pivot position in which the cutter bar that is attached to the front side of the lateral frame is aligned at least approximately parallel to the ground contour across the width of the lateral frame, and the grain to be harvested with the header can be cut close to the ground without crop losses caused by the crop being cut too high and can be transported into the combine harvester. With an appropriate power of the servomotor, an adjusting speed is possible with which the pivot position of the lateral frame can be continuously adapted to changes of the ground contour upon forward travel of the combine harvester across a field to be harvested without the lateral frame colliding with the ground and thereby damaging the header.

According to one embodiment of the invention, the motorically adjustable guide arm is designed as a length-adjustable hydraulic cylinder. A hydraulic cylinder as a servomotor can be integrated easily into the control and governing system of an agricultural machine. By means of a hydraulic cylinder, high adjusting forces can be transmitted, accompanied by precise adjustability of the pivot position of the lateral frame.

According to one embodiment of the invention, the lateral frame is supported additionally by a single-acting or double-acting force store against the center part or the attachment frame. As a force store, mechanical springs, but also alternatively or in combination, a pneumatic or hydraulic buffering action by means of pressure control valves is conceivable. The use of a force store enables active adjustment of a standard pivot position of the lateral frame with a servomotor in order to then allow for minimal changes in the ground contour by pivoting of the lateral frame passively against the force store. In this way, the control expenditure for copying the ground contour during harvesting operation of the combine harvester remains manageable, the fine adjustment of the lateral frames to the ground contour is realized by the passive pivoting action against the force store, while the coarse adjustment is realized by means of a servomotor.

According to one embodiment of the invention, the second end of the motorically adjustable guide arm is connected to the center part and the lateral frame is additionally supported by a single-acting or double-acting force store against the attachment frame. In this solution, the active adjustment of the lateral frame is realized by means of the motorically adjustable guide arm in relation to the center part so that the coarse adjustment of the pivot movement of the side parts to the center part can be adjusted directly by means of a servomotor to a desired adjustment. The finer compression and rebound action against the force store is supported against the attachment frame and thus against the feed channel. In this way, the center part is relieved of the spring forces from the side parts and can be more easily fine-adjusted, in turn, with regard to its height positioning. The spring forces from the lateral frames can be transmitted better by the feed channel directly into the frame of the combine harvester.

According to one embodiment of the invention, the center part is connected to the attachment frame by a hinge with a hinge axis that extends transversely to the forward travel direction of the header, wherein the hinge axis intersects the ball joints, the positioning angle of the center part relative to the attachment frame is changeably adjustable in the forward travel direction of the header by a motorically adjustable guide arm, the center part is connected by respective coupling rods to the lateral frames, and an adjusting movement of the center part which is effected by actuation of the motorically adjustable guide arm is transmitted by means of these coupling rods onto the lateral frames, wherein the lateral frames rotate about the ball joints during their adjusting movement. With this solution, the positioning angle of the entire header relative to the attachment frame can be changed in a simple way. The adjusting force for changing the positioning angle is exclusively introduced by the motorically adjustable guide arm onto the center part of the header from where it is transmitted by means of the coupling rods onto the lateral frames. Since the hinge axis for adjustment of the positioning angle and the pivot axis for lateral pivoting of the lateral frames intersect within the ball joint, the lateral frames, supported respectively by the ball joints, can change their spatial position free of tension and easily in response to the acting adjusting forces. The adjustment is therefore possible with minimal actuation forces; the drives can be designed to be appropriately lightweight which, in turn, reduces the total weight of the header as well as the construction expenditure. The motorically adjustable guide arm can be provided with any type of drives; in particular hydraulic cylinders that themselves may constitute the motorically adjustable guide arm are considered to be easily integrable into an agricultural machine.

According to one embodiment of the invention, the coupling rods are arranged in the upper part of the center part and of the side parts. When the hinge axis is arranged in the lower area of the header and the motorically adjustable guide arm engages in the upper area of the center part, the actuating forces are transmitted by the upper frame parts of the center part onto the lateral frames in this arrangement of the coupling rods. The force flow occurs thus directly in one plane.

According to one embodiment of the invention, the center part and the side parts are connected to each other at their front side by a common undivided cutter bar which is guided in stationary holders and can be oscillatingly driven. The cutter bar stabilizes the relative position of the side parts and of the center part to each other in transverse direction without this requiring additional holding and stabilizing parts. In this way, the weight and construction expenditure for the header are reduced.

It is expressly noted that each of the afore described embodiments of the invention, each on its own but also in any combination with each other, can be combined with the object of the independent claim inasmuch as there are no technically forced obstacles counteracting this.

Further modifications and configurations of the invention can be taken from the following subject matter description and the drawings.

BRIEF DESCRIPTION OF THE DRAWINGS

The invention will now be described in more detail with the aid of one embodiment. It is shown in.

PREFERRED EMBODIMENTS

Figure 1:
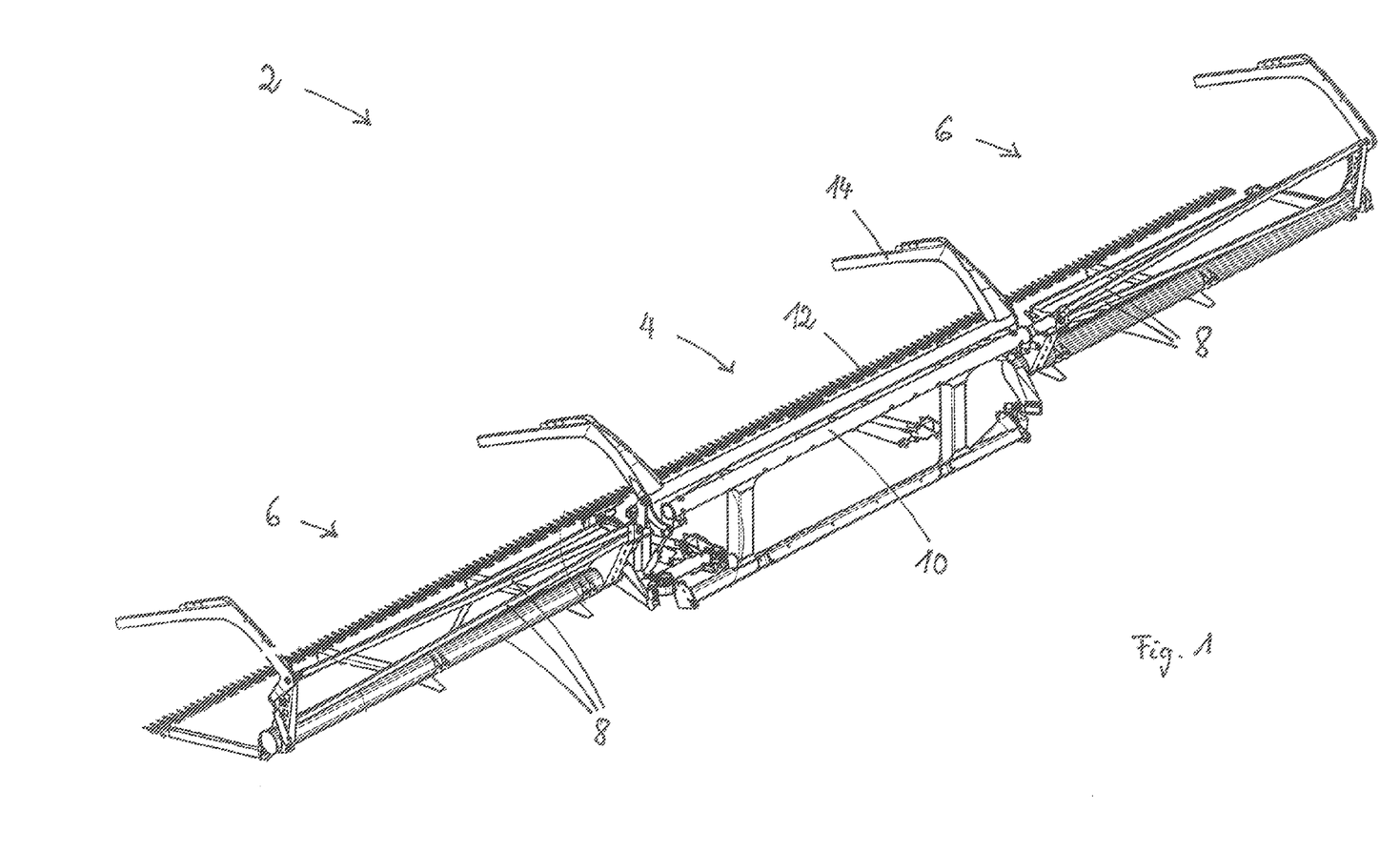
FIG. 1 a view of a header at a slant from behind.

In FIG. 1, a header 2, viewed in the travel direction of a combine harvester, is shown in a view at a slant from above.

The header 2 is comprised in the embodiment of a center part 4 having at both sides a side part 6 each. Each side part 6 comprises a lateral frame 8 which is connected to the attachment frame 10. The attachment frame 10 is designed such that it surrounds the feed channel of a combine harvester, not shown in detail in the drawing, when the header is attached to the combine harvester. By means of the attachment frame 10, the header 2 is thus connected to the feed channel of the combine harvester which supports the header 2 during harvest. At the front end of the header 2, there is a cutter bar 12 with which grain to be harvested is cut.

For reasons of simplification, in FIG. 1 the conveying elements with which the cut crop is transported toward the center of the header and from there is transferred to the feed channel of the combine harvester are not illustrated. Shown are the reel support arms 14 on which one or several reels can be attached. The reel support arms are connected to be height-adjustable to side parts 6 or the center part 4.

In the embodiment, the width of the center part 4 corresponds at least approximately to the width of the attachment frame 10. At the two lateral ends of the attachment frame 10, the components are arranged by means of which the lateral frames 8 are connected to the center part 4 or the attachment frame 10.

Figure 2:
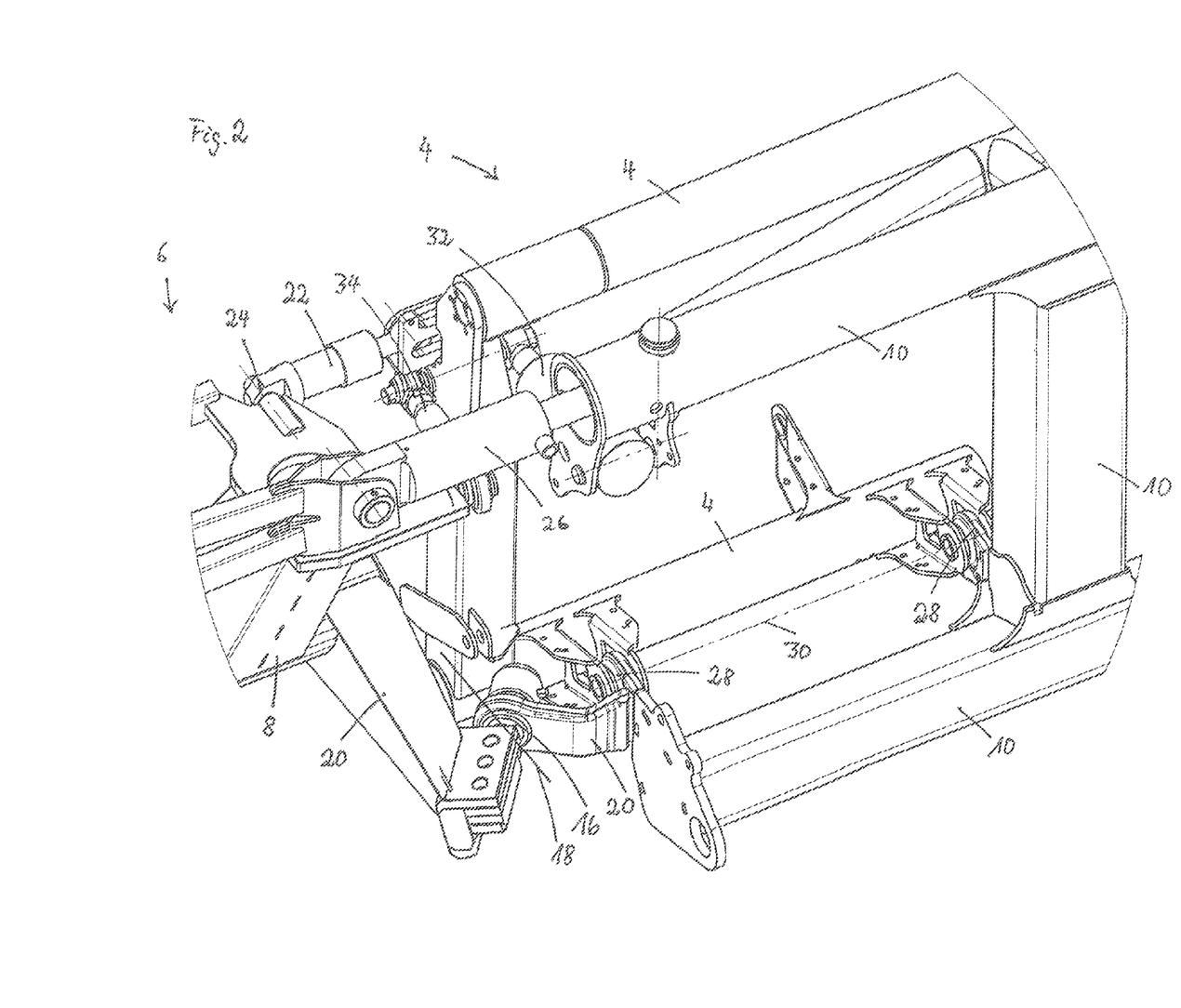
FIG. 2 a view from above at a slant onto the connecting area of the attachment frame with the center part and a lateral frame.

In FIG. 2, an enlarged detail view of the area is illustrated in which a lateral frame 8 is connected to the center part 4 and the attachment frame 10. In the lower area of the attachment frame 10 and lateral relative to the opening in the attachment frame 10, through which the feed channel of the combine harvester extends, a ball joint 16 is provided through which the pivot axis 18 extends about which the lateral frame 8 pivots upon pivoting of the end of the side part 6 facing away from the center part 4. The ball joint 16 is connected by a first guide arm 20 to the attachment frame 10 and by a second guide arm 20 to the lateral frame 8.

Figure 3:
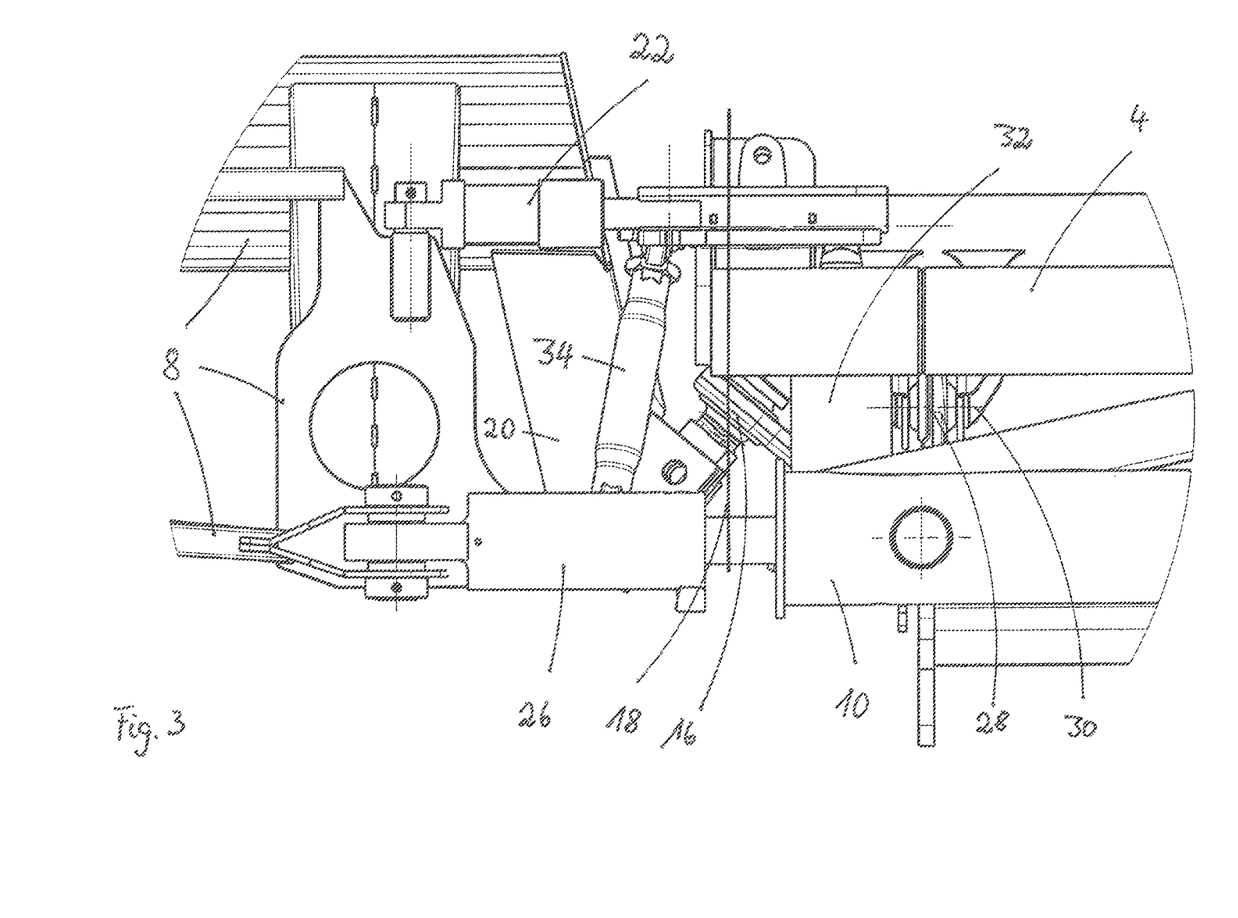
FIGS. 3 and 4 a view from above onto the area shown in FIG. 2.
Figure 4:
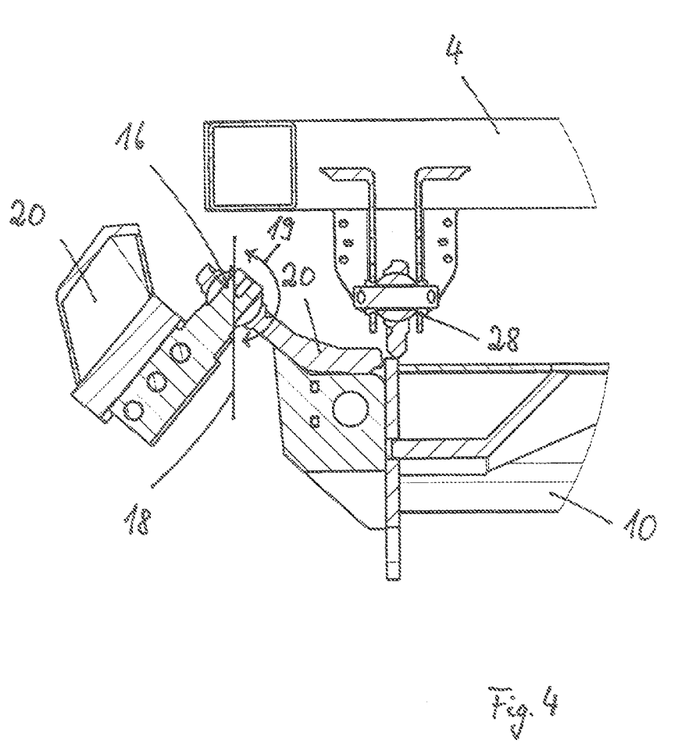

In FIGS. 2, 3, and 4, the pivot axis 18 is illustrated in a substantially horizontal position with alignment precisely in travel direction. Depending on the position of the hydraulic cylinders 22, 26, 32, the spatial position of the pivot axis 18 can change. However, this does not result in severe disadvantages for the function of the header 2.

The two guide arms 20 are of a rigid configuration so that relative movements between in the attachment frame 10 and the lateral frames 8 are possible only by a relative movement between the ball and the ball socket of the ball joint 16.

In the embodiment, a significant part of the weight of the lateral frame 8 is supported on the ball joint 16. The lateral frame 8 is thus supported substantially by the ball joint 16. By means of the first guide arm 20, the weight of the lateral frame 8 which is resting on the ball joint 16 is transmitted onto the attachment frame 10 and thus onto the feed channel of the combine harvester.

In the embodiment, the lateral frame 8 is connected by means of a motorically adjustable guide arm 22 to the center part 4. In the embodiment, the motorically adjustable guide arm 22 is designed as a hydraulic cylinder. Depending on whether the motorically adjustable guide arm 22 is extended or shortened, the pivot position of the lateral frame 8 changes relative to the center part 4 as well as to the attachment frame 10. The motorically adjustable guide arm 22 is connected at point of attack 24 to the lateral frame 8. With its second end, the motorically adjustable guide arm 22 is connected to the center part 4. Since both ends of the motorically adjustable guide arm 22 each are fixedly connected to the lateral frame 8 or the center part 4, a change of the pivot position of the lateral frame 8 results forcibly when the length of the motorically adjustable guide arm 22 is changed. In deviation from the embodiment, the motorically adjustable guide arm 22 can also be connected with its second end to the attachment frame 10 instead of to the center part 4. In the embodiment, the motorically adjustable guide arm 22 is designed as a hydraulic cylinder.

In FIG. 2, a force store 26 is also illustrated that enables, as a spring, a flexible adjustment of the lateral frame 8 to a changing ground contour. In the embodiment, the force store 26 is comprised of a hydraulic cylinder whose hydraulic connectors are connected to overpressure valves. Upon surpassing the pre-adjusted limit values of the overpressure valves, the latter open and enable an appropriate retraction or extension movement of the hydraulic cylinder. In place of the hydraulic cylinder, or in supplementing the latter, mechanical springs or pneumatic force stores can be employed also.

In the embodiment, the force store 26 connects the lateral frame 8 to the attachment frame 10. In deviation of this embodiment, the force store 26 can also be connected to the center part 4 instead of to the attachment frame 10.

In the lower area of the attachment frame 10, in the intermediate space relative to the center part 4 hinges 28 are provided which have a common hinge axis 30. Like the pivot axis 18, the hinge axis 30 intersects the ball joint 16 in the embodiment. Upon actuation of a motorically adjustable guide arm 32 which is connected with its first end to the attachment frame 10 and with its second end to the center part 4, the center part 4 can be pivoted by means of the hinges 28 about the hinge axis 30 in order to change the positioning angle of the center part 4 relative to the attachment frame 10. In the embodiment, the motorically adjustable guide arm 32 is designed as a hydraulic cylinder. Upon extension of the guide arm 32, the upper area of the center part 4 pivots about the hinge axis 30 forwardly while upon retraction of the guide arm 32 the upper part of the center part 4 is retracted again toward the attachment frame 10.

Since the center part 4 is connected by coupling rods 34 to the lateral frames 8, a pivot movement of the center part 4 is transmitted by the coupling rods 34 onto the lateral frame 8 connected to the respective coupling rod 34. Accordingly, when the center part 4 is adjusted by an adjusting movement in its relative position relative to the attachment frame 10, the lateral frames 8 are forcibly adjusted by means of the coupling rods 34 at the same time. During adjusting movement, the lateral frames 8 are supported by the respective ball joints 16 wherein the lateral frames 8 then rotate about the hinge axis 30 by means of the respective ball joint 16.

The coupling rods 34 in the embodiment are located in the upper area of the center part 4 and of the side parts 6. Since the coupling rods 34 at their end which is facing the center part 4 are engaging the frame of the center part immediately adjacent to the motorically adjusted guide arm 32, optimal short travel strokes result for the force transmission in the construction of the frame of the center of part 4.

The view of FIG. 1 illustrates that the center part 4 and the side parts 6 at their front side are connected by the common undivided cutter bar 12 which is guided in stationary holders and can be oscillatingly driven. Even though bending moments are acting on the cutter bar 12 in the area of the pivot axis 18 by the pivot movement of the side parts 6 relative to the center part 4, they are however so small in this area that the function of the cutter bar 12 is not impaired thereby. It should also be taken into consideration that the cutter bar 12 is suspended on movable supports so that the cutter bar 12, by means of an adjusting movement of the supports, can deform at least partially across its length such that the bending moments acting on the cutter bar 12 in the area of the pivot axis 18 are reduced. By means of the cutter bar 12, the side parts 6 at the front edge facing the crop are secured in relation to the center part 4 substantially in a straight line so that the relative position of the center and side parts 4, 6 relative to each other is approximately maintained constant, even though the side parts 6 of the header 2 with their substantial weight are supported only by the respective ball joints 16 and secured in their respective pivot position by the motorically adjustable guide arms 22 and the coupling rods 34.

FIG. 3 shows a view from above onto the area shown in FIG. 2 in a slanted perspective. In the view from above, it can be seen that the ball joint 16 is arranged adjacent to the attachment frame 10 and thus also adjacent to the feed channel of a combine harvester, and the pivot axis 18 and the hinge axis 30 intersect within the ball joint 16. The ball joint 16, viewed in the travel direction of the combine harvester, is arranged behind the center part 4 and between the attachment frame 10 and the center part 4.

In FIG. 4, a section view of the guide arms 22 closely above the area of the ball joint 16 is illustrated. The pivot axis 18 is illustrated in the ball joint 16. By means of the pivot arrow 19, it is indicated that the ball joint 16 not only allows for pivot movements about the pivot axis 18 but also rotational movements of the guide arms 20 relative to each other about the ball joint 16 in other directions. This illustrates that for pivot movements of the side part 6 by means of the ball joint 16 many degrees of freedom are existing, wherein, however, due to the position and adjustability of the other actuators such as the hydraulic cylinders 22, 26, 32 that limit the degrees of freedom of the pivot possibilities, the degrees of freedom are limited such that the movement possibilities approximate the pivot axis 18 in order not to change, if possibly, or only minimally change, the belt length of the belt conveyor upon pivoting movements of the side parts 6.

As a whole, the construction according to the invention provides a very lightweight construction in which, even for great working widths of a header, the side parts can be adjusted quickly and without great force expenditure to the changing ground contour, wherein the adjustment by means of the force store 26 can occur passively and the motorically adjustable guide arm 22 enables an active adjustment.

The afore described embodiment serves only for explaining the invention. The invention is not limited to the embodiment. A person of skill in the art will have no difficulty in modifying the embodiment in a way that seems suitable to him in order to adapt it to a concrete application situation.

What is claimed is:

1. A multi-part header for attachment to a combine harvester, the header comprising:
    an attachment frame;
    a center part configured to be connected by the attachment frame to a feed channel of a combine harvester;
    a first side part comprising a first lateral frame and a second side part comprising a second lateral frame, wherein the first and second lateral frames each are configured to be adjustable so as to change a relative position of the first and second lateral frames to the center part, respectively;
    the first lateral frame connected by a first ball joint directly to a first end of the attachment frame, wherein a weight of the first lateral frame is supported at least partially by the first ball joint on the attachment frame;
    the second lateral frame connected by a second ball joint directly to a second end of the attachment frame, wherein a weight of the second lateral frame is supported at least partially by the second ball joint on the attachment frame;
    wherein the first ball joint forms a first pivot axis and the second ball joint forms a second pivot axis;
    wherein the first lateral frame comprises an end facing away from the center part and the end of the first lateral frame is pivotable about the first pivot axis;
    wherein the second lateral frame comprises an end facing away from the center part and the end of the second lateral frame is pivotable about the second pivot axis;
    wherein the center part is pivotably connected to the attachment frame by hinges, wherein the hinges comprise a hinge axis extending transverse to a forward travel direction of the combine harvester and the center part is configured to change a positioning angle relative to the attachment frame by pivoting about the hinge axis, wherein the hinge axis intersects the first and second ball joints.

2. The header according to claim 1, wherein the first and second ball joints are arranged adjacent to the feed channel of the combine harvester and positioned in an area of a lower half of the feed channel, wherein the header further comprises:
    a first rigid guide arm connecting the first ball joint to the first lateral frame and to the attachment frame;
    a second rigid guide arm connecting the second ball joint to the second lateral frame and to the attachment frame;
    a motorically adjustable guide arm, comprising a first end and a second end, wherein the first end of the adjustable guide arm is connected to the first lateral frame at a connecting point that is spaced apart from the first ball joint and wherein the second end of the adjustable guide arm is connected to the center part or to the attachment frame;
    wherein a pivot position of the first lateral frame supported by the first ball joint is adjustable transversely to a forward travel direction of the combine harvester by actuating the adjustable guide arm.

3. The header according to claim 2, wherein the adjustable guide arm is a length-adjustable hydraulic cylinder.

4. The header according to claim 2, further comprising a single-acting or double-acting force store additionally supporting the first lateral frame relative to the center part or the attachment frame.

5. The header according to claim 2, further comprising a single-acting or double-acting force store, wherein the second end of the adjustable guide arm is connected to the center part and wherein the first lateral frame is additionally supported relative to the attachment frame by the single-acting or double-acting force store.

6. The header according to claim 1, wherein the header further comprises:
    a motorically adjustable guide arm configured to changeably adjust the positioning angle of the center part relative to the attachment frame in the forward travel direction;
    coupling rods connecting the center part to the first and second lateral frames;
    wherein an adjusting movement of the center part effected by actuating the motorically adjustable guide arm is transmitted by the coupling rods onto the first and second lateral frames;

wherein the first and second lateral frames rotate during an adjusting movement about the first and second ball joints.

7. The header according to claim 6, wherein the coupling rods are arranged in an upper area of the center part and of the first and second side parts.

8. The header according to claim 1, further comprising a common undivided cutter bar guided in stationary holders and oscillatingly drivable, wherein the cutter bar connects the center part and the first and second side parts to each other at a front side of the header.

* * * * *